United States Patent

(12) United States Patent
Calnan et al.

(10) Patent No.: US 7,832,457 B2
(45) Date of Patent: *Nov. 16, 2010

(54) MOLDS, DOWNHOLE TOOLS AND METHODS OF FORMING

(75) Inventors: Barry D. Calnan, Conroe, TX (US); Valerie R. C. M. J. Sillen, Brussels (BE)

(73) Assignee: Halliburton Energy Services, Inc., Houston, TX (US)

( * ) Notice: Subject to any disclaimer, the term of this patent is extended or adjusted under 35 U.S.C. 154(b) by 382 days.

This patent is subject to a terminal disclaimer.

(21) Appl. No.: 11/875,304

(22) Filed: Oct. 19, 2007

(65) Prior Publication Data

US 2008/0028891 A1     Feb. 7, 2008

Related U.S. Application Data

(63) Continuation-in-part of application No. 11/741,572, filed on Apr. 27, 2007.

(60) Provisional application No. 60/745,975, filed on Apr. 28, 2006.

(51) Int. Cl.
    *B22C 9/00*          (2006.01)
    *B22C 1/00*          (2006.01)

(52) U.S. Cl. .......................................... 164/15; 164/520

(58) Field of Classification Search .................. 164/4.1, 164/15, 520, 525, 47, 122; 76/108.2; 175/374, 175/425

See application file for complete search history.

(56) References Cited

U.S. PATENT DOCUMENTS 4,054,772 A    10/1977    Lichte ................... 219/121.14
4,884,477 A    12/1989    Smith et al. .................... 76/108
5,121,329 A    6/1992    Crump ........................ 364/468
5,132,143 A    7/1992    Deckard ...................... 427/197
5,204,055 A    4/1993    Sachs et al. ..................... 419/2

(Continued)

FOREIGN PATENT DOCUMENTS

EP             0962623        12/1999

(Continued)

OTHER PUBLICATIONS

International Preliminary Report on Patentability, PCT/US2007/067595, 12 pages, Mailing Date Nov. 6, 2008.

(Continued)

*Primary Examiner*—Kevin P Kerns
(74) *Attorney, Agent, or Firm*—Baker Botts L.L.P.

(57) ABSTRACT

Three dimensional printing equipment and techniques may be used in combination with three dimensional design data associated with well drilling equipment and well completion equipment to form molds associated with manufacture of such equipment. For example, such molds may be used to form a bit body or other components associated with a rotary drill bit. For some applications composite or matrix materials may be placed in the mold to form a matrix bit body. Heat transfer characteristics of the mold may be optimized for heating and/or cooling of the matrix materials to provide optimum fracture resistant (toughness) and optimum erosion, abrasion and/or wear resistance for portions of the bit body. Such molds may also be used to form steel bit bodies associated with fixed cutter rotary drill bits and other components associated with a wide variety of well drilling equipment and well completion equipment.

46 Claims, 8 Drawing Sheets

U.S. PATENT DOCUMENTS

| | | | | |
|---|---|---|---|---|
| 5,260,009 | A | 11/1993 | Penn | 264/40.1 |
| 5,373,907 | A | 12/1994 | Weaver | 175/426 |
| 5,433,280 | A | 7/1995 | Smith | 175/336 |
| 5,544,550 | A | 8/1996 | Smith | 76/108.2 |
| 5,590,454 | A | 1/1997 | Richardson | 29/527.4 |
| 5,819,388 | A | 10/1998 | Salm | 29/424 |
| 5,824,250 | A | 10/1998 | Whalen et al. | 264/219 |
| 5,902,441 | A | 5/1999 | Bredt et al. | 156/284 |
| 5,957,006 | A | 9/1999 | Smith | 76/108.2 |
| 6,007,318 | A | 12/1999 | Russell et al. | 425/130 |
| 6,200,514 | B1 | 3/2001 | Meister | 264/401 |
| 6,296,069 | B1 | 10/2001 | Lamine et al. | 174/434 |
| 6,302,224 | B1 | 10/2001 | Sherwood, Jr. | 175/397 |
| 6,353,771 | B1* | 3/2002 | Southland | 700/197 |
| 6,375,874 | B1 | 4/2002 | Russell et al. | 264/28 |
| 6,416,850 | B1 | 7/2002 | Bredt et al. | 428/297.4 |
| 6,454,030 | B1 | 9/2002 | Findley et al. | 175/425 |
| 6,610,429 | B2 | 8/2003 | Bredt et al. | 428/703 |
| 6,655,481 | B2 | 12/2003 | Findley et al. | 175/425 |
| 6,989,115 | B2 | 1/2006 | Russell et al. | 264/39 |
| 7,037,382 | B2 | 5/2006 | Davidson | 134/21 |
| 7,070,734 | B2 | 7/2006 | Liu et al. | 419/6 |
| 7,087,109 | B2 | 8/2006 | Bredt et al. | 106/691 |
| 2003/0094730 | A1 | 5/2003 | Dourfaye et al. | 264/219 |
| 2007/0277651 | A1* | 12/2007 | Calnan et al. | 76/108.4 |
| 2008/0028891 | A1 | 2/2008 | Calnan et al. | 76/108.4 |

FOREIGN PATENT DOCUMENTS

| | | |
|---|---|---|
| GB | 2315452 | 2/1998 |
| GB | 2 345 930 A * | 7/2000 |
| GB | 2345930 | 7/2000 |

OTHER PUBLICATIONS

International Search Report and Written Opinion, PCT/US2007/067595, 18 pages, Mailing Date Oct. 18, 2007.

"R2 Direct Metal Machine from ProMetal" ProMetal. www.prometal.com (2 pages).

"R-1: Direct Metal R&D Printer" ProMetal. www.prometal.com (2 pages), 2006.

"Prototyping for Direct Metal Casting: Data to Casting in 12 Hours" Product Innovations. Internet (6 pages), Apr. 10, 2007.

"Direct Metal Printing" ProMetal. Internet (2 pages), Jun. 12, 2007.

"Materials: A flexible array of premium powder-binder systems and infiltrants" Z Corporation. www.zcorp.com (2 pages), Jun. 12, 2007.

"ZPrinter 450: World's Most Automated and Affordable Color 3D Printer" Z Coporation. www.zcorp.com (2 pages), Jun. 12, 2007.

"ZPrinter 310 Plus: Fast, Affordable 3D Printing System" Z Corporation. www.zcorp.com (2 pages), Jun. 12, 2007.

"ZPrint Software: A dedicated toolset to optimize CAD files for Z Corp. 3D Printers" Z Corporation. www.zcorp.com (1 page), Jun. 12, 2007.

"Spectrum Z510 System: Next Generation High-Definition Color 3D Printing System" Z Corporation. www.zcorp.com (2 pages), Jun. 12, 2007.

"ZScanner 700: The First Self-Positioning, Real-time Surfacing, 3D Laser Scanner" Z Corporation. www.zcorp.com (4 pages), Jun. 12, 2007.

European Office Action; Application No. 07 761 422.0-1253; pp. 3, Jul. 1, 2009.

Digital Sand Casting Service, ProMetal RCT™, © 2007, 6 pages.

* cited by examiner

MOLDS, DOWNHOLE TOOLS AND METHODS OF FORMING

RELATED APPLICATION

This application is a continuation-in-part under 35 U.S.C. §120 of U.S. patent application Ser. No. 11/741,572, filed Apr. 27, 2007 and titled "MOLDS AND METHODS OF FORMING MOLDS ASSOCIATED WITH MANUFACTURE OF ROTARY DRILL BITS AND OTHER DOWNHOLE TOOLS" which claimed the benefit of U.S. Provisional Patent Application Ser. No. 60/745,975 filed Apr. 28, 2006 entitled "ROTARY DRILL BITS AND METHODS OF FORMING MOLDS ASSOCIATED WITH MANUFACTURE OF ROTARY DRILL BIT".

TECHNICAL FIELD

The present disclosure is related to molds, methods of forming molds and more particularly to fixed cutter drill bits and other downhole tools associated with forming and/or completing wellbores.

BACKGROUND OF THE DISCLOSURE

Rotary drill bits are frequently used to drill oil and gas wells, geothermal wells and water wells. Rotary drill bits may be generally classified as rotary cone or roller cone drill bits and fixed cutter drilling equipment or drag bits. Fixed cutter drill bits or drag bits are often formed with a bit body having cutting elements or inserts disposed at select locations of exterior portions of the bit body. Fluid flow passageways are typically formed in the bit body to allow communication of drilling fluids from associated surface drilling equipment through a drill string or drill pipe attached to the bit body.

Fixed cutter drill bits generally include a metal shank operable for engagement with a drill string or drill pipe. Various types of steel alloys may be used to form a metal shank. A bit head may be attached to an associated shank to form a resulting bit body.

For some applications a bit head may be formed from various types of steel alloys satisfactory for use in drilling a wellbore through a downhole formation. The resulting bit body may sometimes be described as a "steel bit body." For other applications, a bit head may be formed by molding hard, refractory materials with a metal blank. A steel shank may be attached to the metal blank. The resulting bit body may be described as a "matrix bit body." Fixed cutter drill bits or drag bits formed with matrix bit bodies may sometimes be referred to as "matrix drill bits."

Matrix drill bits are often formed by placing loose infiltration material or matrix material (sometimes referred to as "matrix powder") into a mold and infiltrating the matrix material with a binder such as a copper alloy. Other metallic alloys may also be used as a binder. Infiltration materials may include various refractory materials. A preformed metal blank or bit blank may also be placed in the mold to provide reinforcement for a resulting matrix bit head. The mold may be formed by milling a block of material such as graphite to define a mold cavity with features corresponding generally with desired exterior features of a resulting matrix drill bit.

Various features of a resulting matrix drill bit such as blades, cutter pockets, and/or fluid flow passageways may be provided by shaping the mold cavity and/or by positioning temporary displacement material within interior portions of the mold cavity. An associated metal shank may be attached to the bit blank after the matrix bit head has been removed from the mold. The metal shank may be used to attach of the resulting matrix drill bit with a drill string.

A wide variety of molds have been used to form matrix bit bodies and associated matrix drill bits. U.S. Pat. No. 5,373,907 entitled "Method And Apparatus For Manufacturing And Inspecting The Quality Of A Matrix Body Drill Bit" shows some details concerning conventional mold assemblies and matrix bit bodies.

A wide variety of molds and castings produced by such molds have been used to form steel bit bodies and associated fixed cutter drill bits.

SUMMARY OF THE DISCLOSURE

In accordance with teachings of the present disclosure, three dimensional (3D) printing equipment and techniques may be used in combination with three dimensional (3D) design data associated with a wide variety of well drilling equipment and well completion equipment to form molds for producing various components associated with such equipment. For some applications refractory materials, infiltration materials and/or matrix materials, typically in a powder form, may be placed in such molds. For other applications molten steel alloys or other molten metal alloys may be poured into such molds. Heat transfer characteristics of such molds may be optimized for both heating and cooling of matrix materials or cooling of molten metal alloys to provide optimum fracture resistant (toughness), optimum tensile strength and/or optimum erosion, abrasion and/or wear resistance of resulting components.

Combining characteristics of a 3D printer with 3D design data may allow greater freedom to design molds having mold cavities with complex configurations and dimensions as compared to more limited design options when using conventional mold forming techniques. Manufacturing costs for such molds and associated components may also be reduced as compared with some conventional mold forming techniques.

One aspect of the present disclosure may include using three dimensional (3D) printing equipment and techniques in combination with three dimensional (3D) computer aided design (CAD) data associated with fixed cutter drill bits to produce respective molds having a "negative image" of various portions of each fixed cutter drill bit. Such molds may be used to form a matrix bit head or a steel bit head for a respective fixed cutter drill bit.

Another aspect of the present disclosure may include using 3D printing equipment and techniques in combination with 3D CAD data associated with core bits, open hole reamers, near bit reamers and other downhole tools to produce respective molds having a "negative image" of various components of such well tools.

A further aspect of the present disclosure may include using 3D printing equipment and techniques in combination with 3D design data to directly produce various components associated with fixed cutter drill bits and other types of downhole tools without the use of molds. Such downhole tools may be used to form wellbores in downhole formations (well drilling equipment or well drilling tools) or may be used to complete a wellbore extending through a downhole formation (well completion equipment or well completion tools).

Another aspect of the present disclosure may include using 3D printing equipment in combination with 3D design data to form respective portions of a mold from materials having different thermal conductivity and/or electrical conductivity characteristics. For example, providing high thermal conductivity proximate a first end or bottom portion of a mold may improve heat transfer during heating and cooling of materials disposed within the mold. Thermal conductivity may be relatively low proximate a second end or top portion of the mold to function as an insulator for better control of heating and/or cooling of materials disposed within the mold.

A mold formed in accordance with teachings of the present disclosure may have variations in electrical conductivity to accommodate varying heating and/or cooling rates of materials disposed within the mold. For example, one or more portions of the mold may be formed from materials having electrical conductivity characteristics compatible with an associated microwave heating system or an induction heating system. As a result, such portions of the mold may be heated to a higher temperature and/or heated at a higher rate than other portions of the mold which do not have such electrical conductivity characteristics.

Another aspect of the present disclosure may include placing degassing channels at optimum locations within a mold to allow degassing or off gassing of materials disposed within the mold. Fluid flow channels may be placed at optimum locations on interior and/or exterior portions of a mold with optimum configurations to heat and/or cool materials disposed within the mold. Various types of liquids and/or gases may be circulated through such fluid flow channels.

Prior art references have previously discussed potential benefits of forming a mold having fluid flow channels to optimize heating, cooling and/or degassing of materials during solidication within the mold. However, previously available machining techniques and conventional mold forming techniques have limited the ability to effectively commercialize use of such heating, cooling and/or degassing fluid channels.

For some embodiments, interior portions of a mold or mold cavity may be coated by a mold wash to prevent gases produced by heating the mold from entering into powders or matrix materials disposed within the mold cavity. The mold wash may form a diffusion barrier or create a skin effect to prevent off gases from mold materials migrating into matrix materials or other materials disposed within the mold cavity.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE DISCLOSURE

Figure 1:
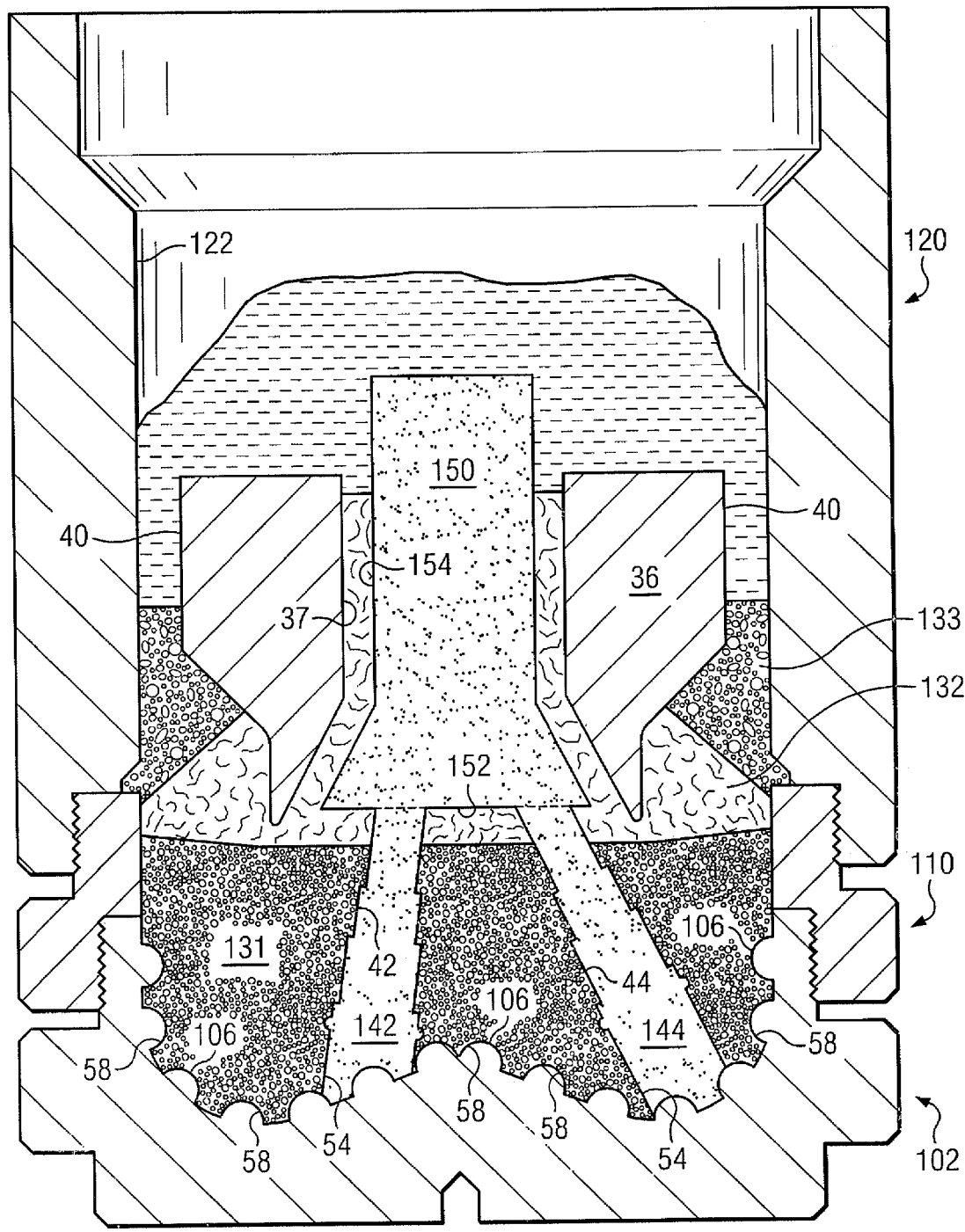
FIG. 1 is a schematic drawing in section with portions broken away showing one example of a prior art mold which may be used to form a bit head for a matrix bit body.

Preferred embodiments of the disclosure and its advantages are best understood by reference to FIGS. 1-8 wherein like numbers refer to same and like parts.

Various features and steps of the present disclosure may be described with respect to forming a bit body for a rotary drill bit. Portions of the bit body formed in a mold may be referred to as a "bit head." For some embodiments a "bit body" may generally be described as a bit head with a metal shank attached thereto. Some prior art references may refer to a bit head (as used in this application) as a bit body. Some bit bodies may be formed with an integral bit head and metal shank in accordance with teachings of the present disclosure.

For purposes of describing various features and steps of the present disclosure, the terms "downhole tool" and "downhole tools" may be used to describe well drilling equipment, well drilling tools, well completion equipment, well completion tools and/or associated components which may be manufactured using molds formed in accordance with teachings of the present disclosure. Examples of such well completion tools and/or associated components (not expressly shown) which may be formed at least in part by molds incorporating teachings of the present disclosure may include, but are not limited to, whipstocks, production packer components, float equipment, casing shoes, casing shoes with cutting structures, well screen bodies and connectors, gas lift mandrels, downhole tractors for pulling coiled tubing, tool joints, wired (electrical and/or fiber optic) tool joints, drill in well screens, rotors, stator and/or housings for downhole motors, blades and/or housings for downhole turbines, latches for downhole tools, downhole wireline service tools and other downhole tools have complex configurations and/or asymmetric geometries associated with competing a wellbore. Molds incorporating teachings of the present disclosure may be used to form elastomeric and/or rubber components for such well completion tools. Various well completion tools and/or components may also be formed using a 3D printer in combination with 3D design data in accordance with teaching of the present disclosure.

Examples of well drilling tools and associated components (not expressly shown) which may be formed at least in part by molds incorporating teachings of the present disclosure may include, but are not limited to, non-retrievable drilling components, aluminum drill bit bodies associated with casing drilling of wellbores, drill string stabilizers, cones for roller cone drill bits, models for forging dies used to fabricate support arms for roller cone drill bits, arms for fixed reamers, arms for expandable reamers, internal components associated with expandable reamers, sleeves attached to an up hole end of a rotary drill bit, rotary steering tools, logging while drilling tools, measurement while drilling tools, side wall coring tools, fishing spears, washover tools, rotors, stators and/or housing for downhole drilling motors, blades and housings for downhole turbines, and other downhole tools having complex configurations and/or asymmetric geometries associated with forming a wellbore. Molds incorporating teachings of the present disclosure may be used to form a elastomeric and/or rubber components for such well drilling tools. Various well drilling tools and/or components may also be formed using a 3D printer in combination with 3D design data in accordance with teachings of the present disclosure.

For purposes of describing various features and steps of the present disclosure, the terms "downhole tool" and "downhole tools" may also be used to describe well drilling equipment, well drilling tools, well completion equipment, well completion tools and/or associated components which may be directly formed using 3D printing equipment and techniques in combination with 3D design data in accordance with teachings of the present disclosure.

Various techniques have previously been used to form molds associated with fabrication of matrix bit bodies and/or steel bit bodies for fixed cutter drill bits. For example numerically controlled machines and/or manual machining processes have been used to fabricate molds from various types raw material blanks. For example, graphite based materials in the form of solid, cylindrical blanks have been machined to form a mold cavity with dimensions and configurations that represent a negative image of a bit head for an associated matrix drill bit.

Figure 2:
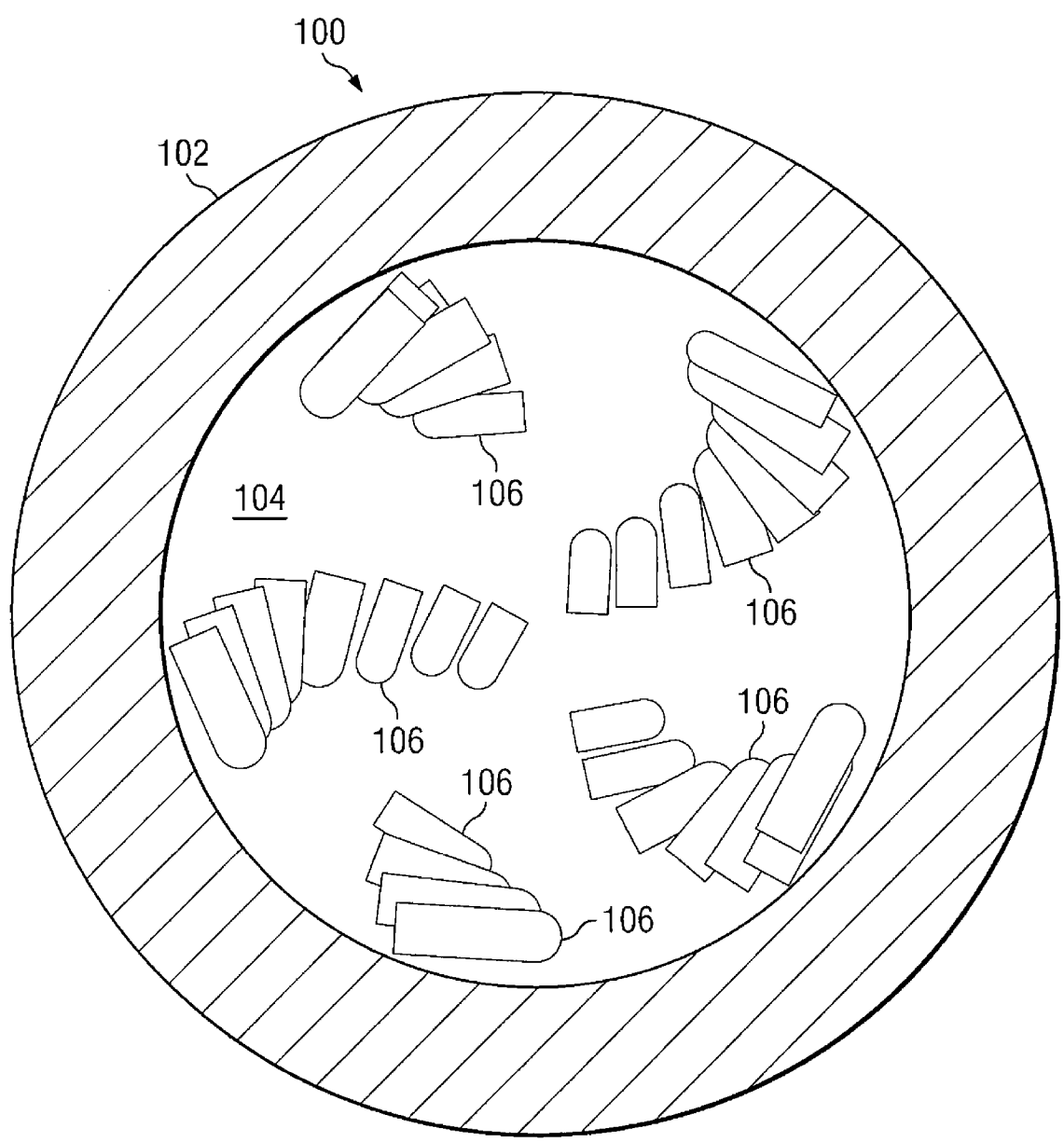
FIG. 2 is a schematic drawing showing an interior view of a mold such as shown in FIG. 1.

Mold assembly 100 as shown in FIGS. 1 and 2 represents only one example of a wide variety of molds which have previously been used to form matrix bit heads and associated matrix drill bits. U.S. Pat. No. 5,373,907 entitled Method And Apparatus For Manufacturing And Inspecting The Quality Of A Matrix Body Drill Bit shows additional details concerning conventional mold assemblies and matrix bit bodies.

Figure 4:
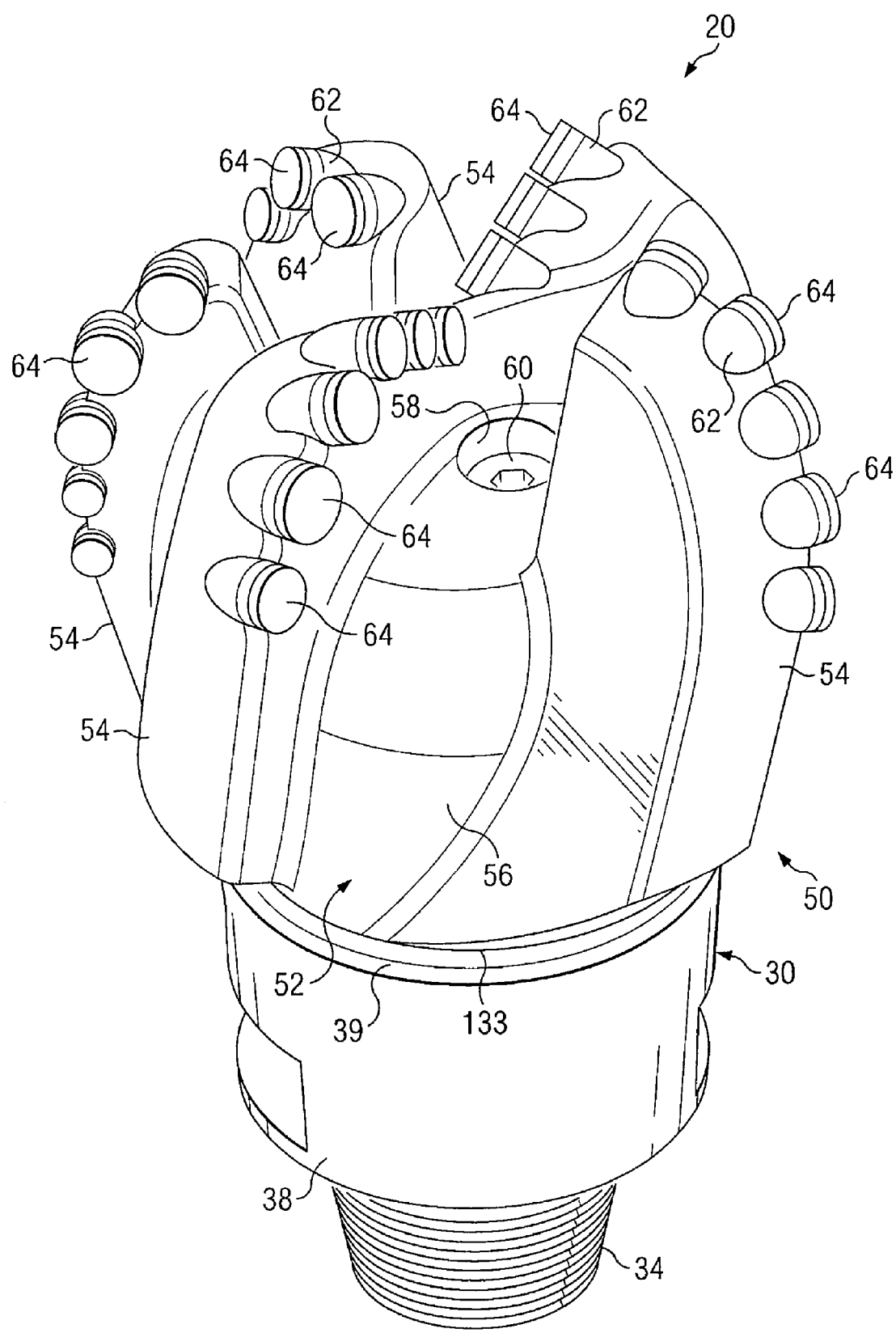
FIG. 4 is a schematic drawing showing an isometric view of one example of a fixed cutter drill bit having a matrix bit body which may be formed in accordance with teachings of the present disclosure.
Figure 5A:
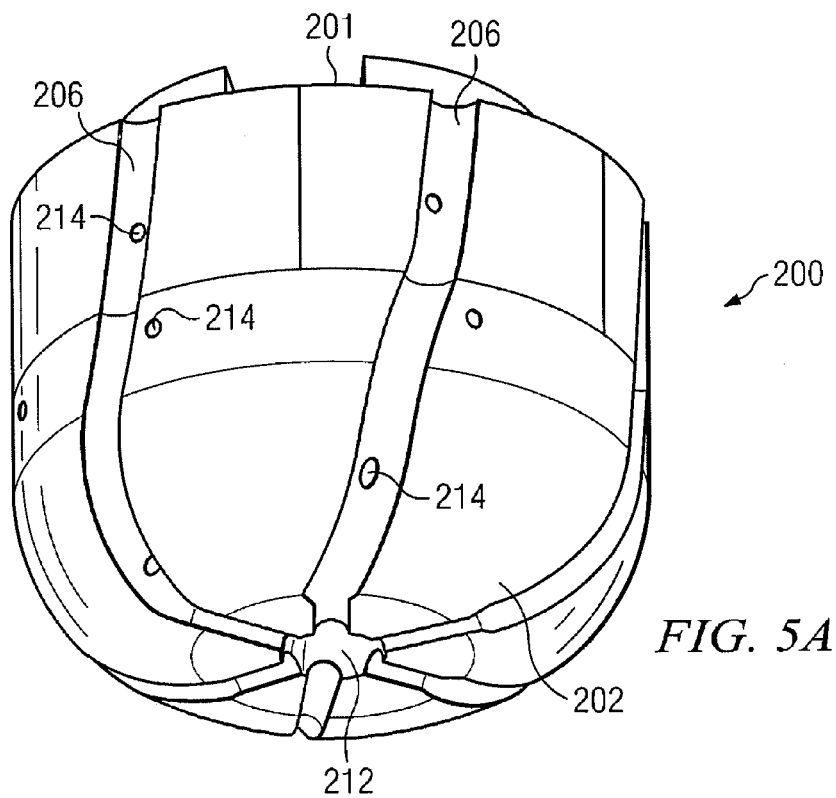
FIG. 5A is a schematic drawing showing a isometric view of a mold formed in accordance with teachings of the present disclosure which may be used to form a bit head for a fixed cutter rotary drill bit.
Figure 5B:
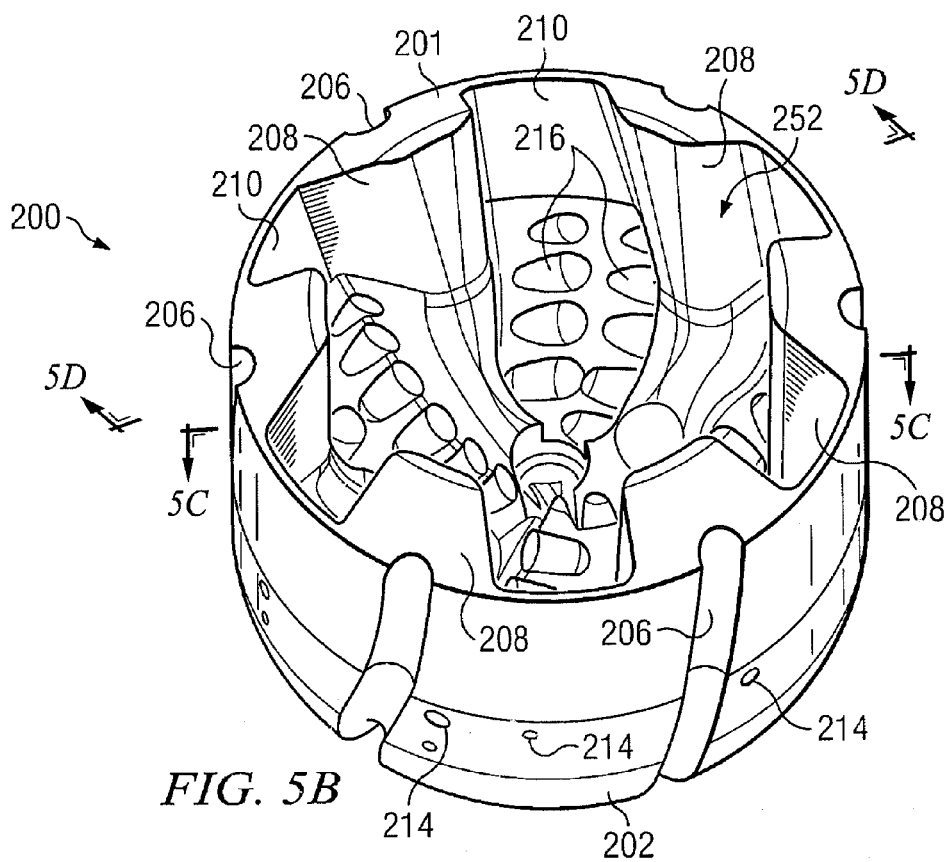
FIG. 5B is a schematic drawing showing another isometric view of the mold of FIG. 5A.
Figure 5C:
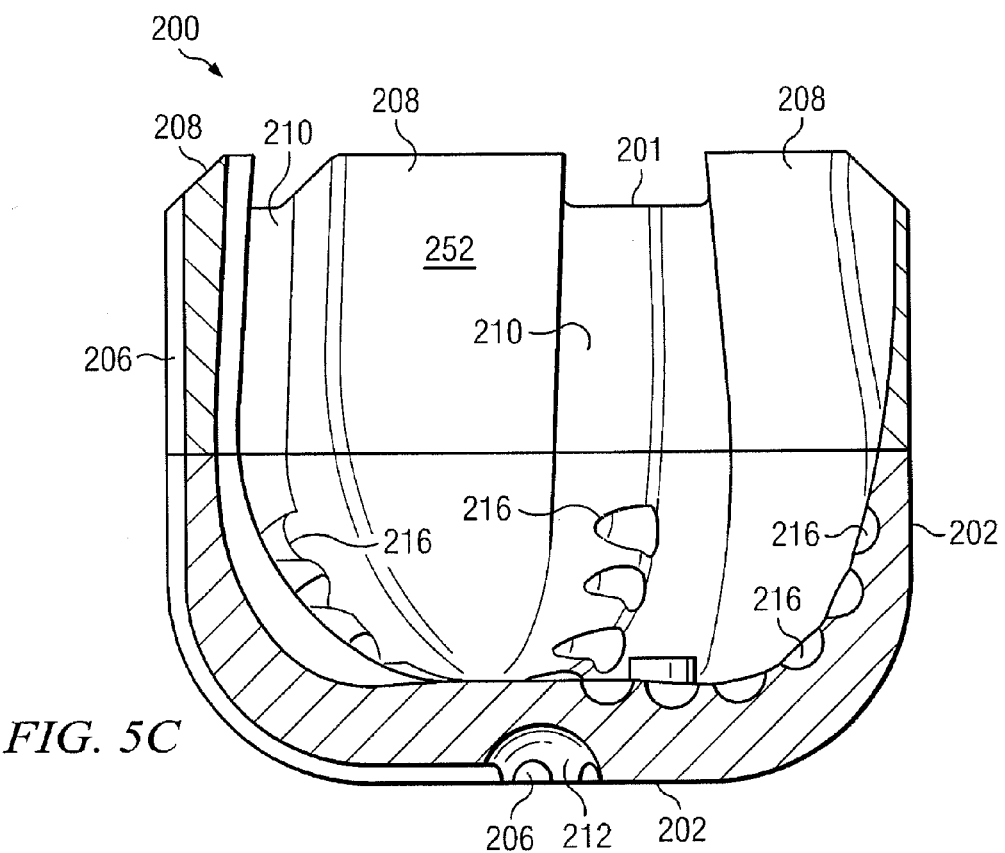
FIG. 5C is a drawing in section taken along lines 5C-5C of FIG. 5B.
Figure 5D:
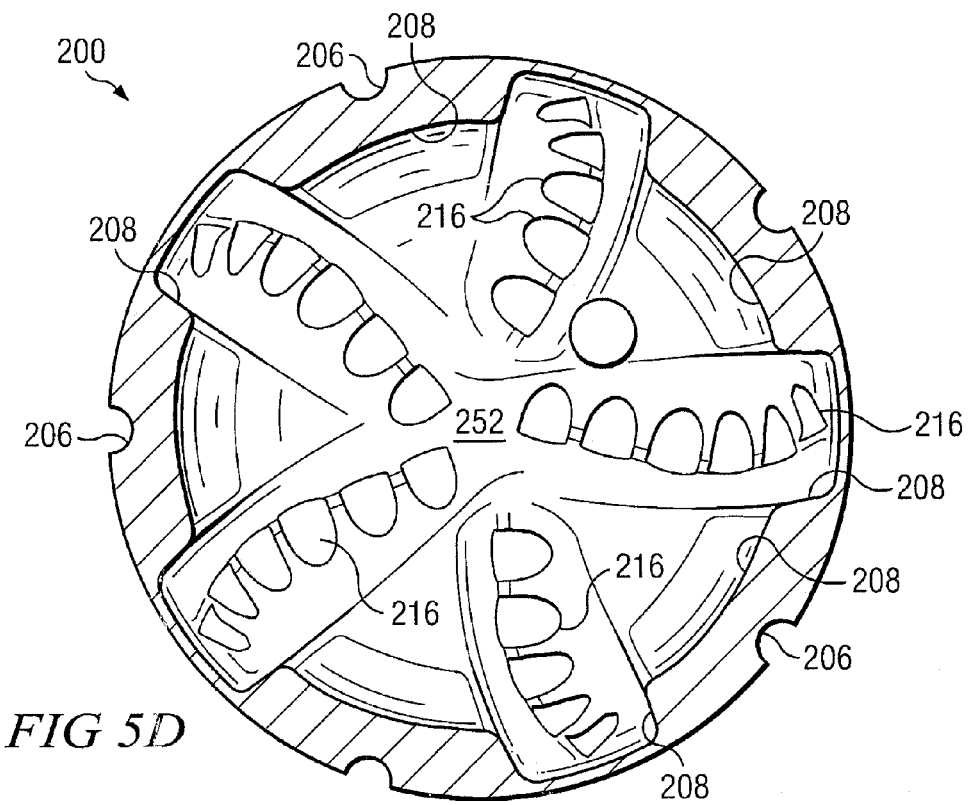
FIG. 5D is a schematic drawing in section taken along lines 5D-5D of FIG. 5C.

Mold assembly 100 as shown in FIGS. 1 and 2 may include several components such as mold 102, gauge ring or connector ring 110 and funnel 120. Mold 102, gauge ring 110 and funnel 120 may be formed from graphite or other suitable materials. Various techniques may be used including, but not limited to, machining a graphite blank to produce mold 102 with cavity 104 having a negative profile or a reverse profile of desired exterior features for a resulting fixed cutter drill bit. See FIG. 2. For example cavity 104 may have a negative profile which corresponds with an exterior profile or configuration for blades 54 and junk slots or fluid flow passageways 50 formed therebetween for a matrix drill bit. One example of a matrix drill bit is shown in FIG. 4.

As shown in FIGS. 1 and 2, a plurality of mold inserts 106 may be placed within cavity 104 to form respective pockets 62 in blades 54. Pockets 62 may also be described as "sockets" or "receptacles." Mold inserts 106 may be disposed in cavity 104 at locations generally corresponding with desired locations for installing cutting elements 64 in associated blades 54. Mold inserts 106 may be formed from various types of material such as, but not limited to, consolidated sand and graphite. Various techniques such as brazing may be satisfactorily used to install cutting elements 64 in respective pockets 62 after bit head 52 has been removed from mold assembly 100.

Various types of displacement materials, mold inserts and/or preforms may be temporarily or permanently disposed within mold cavity 104, depending upon each desired configuration for a resulting matrix drill bit. Such mold inserts, displacements and/or preforms (not expressly shown) may be formed from various materials including, but not limited to, consolidated sand and/or graphite. Various resins may be satisfactorily used to form consolidated sand. Such mold inserts, displacements and/or preforms may have configurations corresponding with desired exterior features of a matrix bit body including, but not limited to, fluid flow passageways or junk slots formed between adjacent blades.

As discussed later in more detail, teachings of the present disclosure allow forming molds with interior and/or exterior configurations and dimensions which may not be commercially possible to form using conventional machining and/or other mold forming techniques. Teachings of the present disclosure may also allow forming molds with optimum variations in thermal conductivity and/or electrical conductivity.

Figure 3:
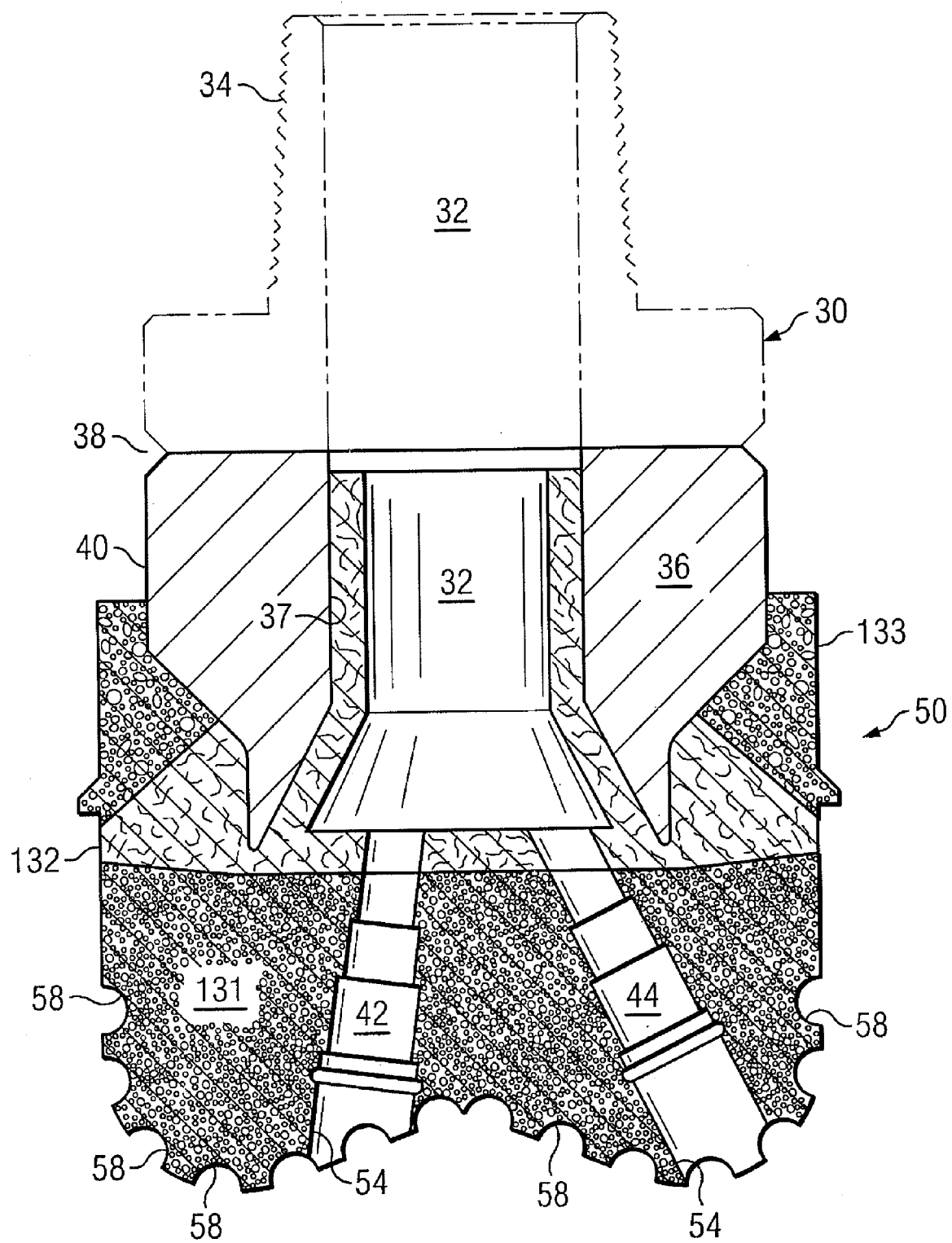
FIG. 3 is a schematic drawing in section with portions broken away showing one example of a fixed cutter bit body formed by a mold such as shown in FIGS. 1 and 2.

Matrix bit body 50 as shown in FIG. 3 may include matrix bit head 52 and metal shank 30 (shown in dotted lines). A relatively large fluid cavity or chamber with multiple fluid flow passageways 32, 42 and 44 extending therefrom may be formed within matrix bit head 52. As shown in FIG. 1, displacement materials such as consolidated sand core 150 may be installed within mold assembly 100 at desired locations to form portions of a large fluid cavity with fluid flow passages 42 and 44 extending therefrom. Fluid flow passageways 42 and 44 may be operable to receive threaded receptacles (not expressly shown) for holding respective nozzles 60 therein. See FIG. 4.

Relatively large, generally cylindrically shaped consolidated sand core 150 may be placed on legs 142 and 144 formed from consolidated sand. Core 150 may also be referred to as a "stalk." Core 150 and legs 142 and 144 may be sometimes described as having the shape of a "crow's foot." The number of legs 142 and 144 extending from core 150 may depend upon the desired number of nozzle openings in a resulting matrix bit head. Legs 142 and 144 and core 150 may also be formed from graphite or other suitable materials. Teachings of the present disclosure allow forming fluid flow passageways and nozzle receptacles with optimum configurations, dimensions and/or orientations within an associated bit head that may not be possible using consolidated sand and/or other conventional mold forming techniques.

After desired displacement materials, including core 150 and legs 142 and 144, have been installed within mold assembly 100, at least one matrix material, typically in powder form, may be placed therein. For prior art examples represented by FIGS. 1 and 3, first matrix material 131 having optimum fracture resistance characteristics (toughness) and optimum erosion, abrasion and wear resistance, may be placed within mold assembly 100. First matrix material 131 may form a first zone or a first layer which will correspond approximately with exterior portions of composite matrix bit body 50 which contact and remove formation materials during drilling of a wellbore. The amount of first matrix material 131 add to mold assembly 100 will preferably be limited such that matrix material 131 does not contact end 152 of sand core 150.

A generally hollow, cylindrical metal blank 36 may also be placed within mold assembly 100. Metal blank 36 may include inside diameter 37 which is larger than the outside diameter of sand core 150. Metal blank 36 may also include outside diameter 40. Various fixtures (not expressly shown) may be used to position metal blank 36 within mold assembly 100 at a desired location spaced from first matrix material 131.

Second matrix material 132 may then be loaded into mold assembly 100 to fill a void space or annulus formed between outside diameter 154 of sand core 150 and inside diameter 37 of metal blank 36. Second matrix material 132 may cover first matrix material 131 including portions of first matrix material 131 located adjacent to and spaced from end 152 of core 150.

Second matrix material 132 may be primarily used to form interior portions of matrix bit body 50 and exterior portions of matrix bit body 50 which typically do not contact adjacent downhole formation materials while forming a wellbore.

For some applications third matrix material 133 may be placed within mold assembly 100 between outside diameter 40 of metal blank 36 and inside diameter 122 of funnel 120. Third matrix material 133 may be subsequently machined to provide a desired exterior configuration and transition between matrix bit head 52 and metal shank 36. See FIGS. 1 and 3.

A wide variety of equipment and procedures have been developed to form models, molds and prototypes using automated layering devices. U.S. Pat. No. 6,353,771 entitled "Rapid Manufacturing Of Molds For Forming Drill Bits" provides examples of such equipment and procedures.

Various techniques and procedures have also been developed to use three dimensional (3D) printers to form models, molds and prototypes using 3D design data. See, for example, information available at the websites of Z Corporation (www-.zcorp.com) and ProMetal, a division of The Ex One Company (www.prometal.com).

U.S. Pat. No. 5,204,055 entitled "Three-Dimensional Printing Techniques" and related patents discuss various techniques such as ink jet printing to deposit thin layers of material and inject binder material to bond each layer of powder material. Such techniques have been used to "print" molds satisfactory for metal casting of relatively complex configurations. U.S. Pat. No. 7,070,734 entitled "Blended Powder Solid-Supersolidus Liquid Phase Sintering" and U.S. Pat. No. 7,087,109 entitled "Three Dimensional Printing Material System and Method" also disclose various features of 3D printing equipment which may be used with 3D design data.

Binder material including, but not limited to, metallic alloys of copper (Cu), nickel (Ni), magnesium (Mn), lead (Pb), tin (Sn), cobalt (Co) and silver (Ag) may be used with some embodiments of the present disclosure. Phosphorous (P) may sometimes be added in small quantities to reduce liquidity temperature of infiltration materials disposed in a mold. Various mixtures of such metallic alloys may also be used.

For some applications three dimensional (3D) design data for a fixed cutter drill bit such as shown in FIG. 4 may be used in combination with 3D printing equipment and techniques to form a mold having a mold cavity with a "negative image" of exterior portions of the fixed cutter drill bit. See FIGS. 5A-5D and 6. Various types of mold cavity inserts, displacements, preforms and other mold related structures may also be fabricated in accordance with teachings of the present disclosure using 3D design data and a 3D printer in accordance with teachings of the present disclosure. The use of 3D printing equipment and techniques may result in a higher level of accuracy and reduced cost per mold or mold cavity insert. For some applications 3D printing equipment and techniques may be capable of producing molds with complex configurations, dimensions and/or tolerances that may not be possible to commercially produce at reasonable costs using conventional numerically controlled machines, manual machining techniques, consolidated sand preforms and/or other conventional mold forming techniques.

The use of 3D printing equipment and techniques in combination with 3D design data may eliminate the need for programming a numerically controlled machine and milling a mold from a graphite blank or other suitable blank. The use of 3D printing equipment and techniques in combination with 3D design data may allow forming complex geometrical configurations associated with sockets or pockets for installing cutting elements in exterior portions of a bit body as an integral part of a mold cavity. Complex configurations for cutter blades, junk slots, arms associated with under reamers (not expressly shown) and other components of various downhole tools may be formed as an integral part of a mold cavity. The number of mold cavity inserts and/or preforms required to form a bit head or other components of well drilling tools and well completion tools may be substantially reduced or eliminated.

Using 3D printing equipment and techniques in combination with 3D design data in accordance with teachings of the present disclosure may eliminate many manufacturing problems associated with fabrication of molds used to form matrix bit heads and other components of rotary drill bits. Using 3D printing equipment and techniques in combination with 3D design data in accordance with teachings of the present disclosure may eliminate the need for using molds to form bit heads, bit bodies and other components associated with well drilling tools and/or well completion tools.

FIG. 4 is a schematic drawing showing one example of a fixed cutter drill bit or rotary drill bit having a bit head which may be formed in a mold incorporating teachings of the present disclosure. Such bit heads may sometimes be referred to as matrix bit heads or composite bit heads. At least one matrix material, often in powder form, may be placed in a mold formed in accordance with teachings of the present disclosure.

Matrix materials may sometimes be referred to as refractory materials or infiltration materials. Examples of such matrix materials may include, but are not limited to, tungsten carbide, monotungsten carbide (WC), ditungsten carbide ($W_2C$), macrocrystalline tungsten carbide, other metal carbides, metal borides, metal oxides, metal nitrides and polycrystalline diamond (PCD). Examples of other metal carbides may include, but are not limited to, titanium carbide and tantalum carbide. Various mixtures of such materials may also be used.

A mold, filled with at least one matrix material and at least one binder, may be heated and cooled to form a matrix bit head. For some applications two or more different types of matrix materials or powders may be disposed in the mold. A resulting drill bit may sometimes be referred to as a matrix drill bit.

For some embodiments drill bit 20 may include matrix bit head 52 formed in a mold incorporating teachings of the present disclosure. For other applications matrix bit head 52 may be directly formed from refractory materials using a 3D printer and associated techniques in combination with 3D design data in accordance with teachings of the present disclosure.

Metal shank 30 may be described as having a generally hollow, cylindrical configuration defined in part by a fluid flow passageway (not expressly shown). Various types of threaded connections, such as American Petroleum Institute (API) connection or threaded pin 34, may be formed on metal shank 30. Shank 30 may be attached to metal blank 36 after bit head 52 has been removed from an associated mold. Shank 30 and bit head 52 when attached to each other form resulting matrix bit body 50. Cutting elements 64 may be disposed in respective pockets 62 after bit body 50 has been formed to provide rotary drill bit 20.

Generally cylindrical metal shank 30 may be attached to hollow, metal blank 36 using various techniques. For example an annular weld groove 38 may be formed between adjacent portions of shank 30 and hollow, metal blank 36. Weld 39 may be formed in annular weld groove 38 to securely attach portions of shank 30 with adjacent portions of hollow metal blank 36. A fluid flow passageway or longitudinal bore (not expressly shown) may extend through metal shank 30 and metal blank 36.

A plurality of nozzle openings 58 may form in matrix bit body 50. Respective nozzles 60 may be disposed in each nozzle opening 58. For some applications nozzles 60 may be described as "interchangeable" nozzles. Various types of drilling fluid may be pumped from surface drilling equipment (not expressly shown) through a drill string (not expressly shown) attached with threaded connection 34 and associated fluid flow passageways (not expressly shown) to exit from one or more nozzles 60. The cuttings, downhole debris, formation fluids and/or drilling fluid may return to the well surface through an annulus (not expressly shown) formed between exterior portions of the drill string and interior of an associated wellbore (not expressly shown).

For embodiments such as shown in FIG. 4, a plurality of cutter blades 54 may be disposed on exterior portions of matrix bit body 50. Cutter blades 54 may be spaced from each other on the exterior of matrix bit body 50 to form fluid flow paths or junk slots 56 therebetween.

A plurality of pockets or recesses 62 may be formed in blades 52 at selected locations. Respective cutting elements or inserts 64 may be securely mounted in each pocket 62 to engage and remove adjacent portions of a downhole formation. Cutting elements 64 may scrape and gouge adjacent formation materials to form a wellbore during rotation of drill bit 20 by an attached drill string (not expressly shown). For some applications various types of polycrystalline diamond compact (PDC) cutting elements may be satisfactorily used as inserts 60. Drill bits having such PDC cutters may sometimes be referred to as a "PDC bit".

U.S. Pat. No. 6,296,069 entitled "Bladed Drill Bit with Centrally Distributed Diamond Cutters" and U.S. Pat. No. 6,302,224 entitled "Drag-Bit Drilling with Multi-Axial Tooth Inserts" show various examples of blades and/or cutting elements which may be used with a matrix bit body formed in accordance with teachings of the present disclosure. It will be readily apparent to persons having ordinary skill in the art that a wide variety of fixed cutter drill bits, drag bits and other types of rotary drill bits may be satisfactorily formed from a bit body molded in accordance with teachings of the present disclosure. The present disclosure is not limited to drill bit 20 or any specific features discussed in the application.

A wide variety of powders and binders have previously been used with 3D printers to form various types of molds and other complex three dimensional products. For some applications 3D printing equipment may be used to deposit relatively thin layers of powder having dimensions corresponding with associated 3D design data for a fixed cutter drill bit. 3D printing equipment may include a printer head operable to eject one or more types of binder into each thin layer of powder. Other methods of 3D printing may also be used. For example, 3D printing equipment available from Z Corporation and ProMetal deposit relatively thin layers of powder and then apply a binder to each thin layer of powder in dimensions corresponding with associated 3D design data for a fixed cutter drill bit. These methods may be employed to produce a mold with a mold cavity having a configuration and dimensions based on the 3D design data for the drill bit For some applications powder layers may be formed from graphite based materials, boron nitride based materials and/or other materials having heat transfer characteristics and dimensional stability satisfactory for molding a matrix bit body, casting a steel bit body or forming various components associated with well completion tools and well drilling tools. Graphite powders, boron nitride powders and other matrix material powders which are stable in temperature ranges associated with forming matrix bit bodies may be satisfactory used. Such powders may have better thermal conductivity and/or better dimensional stability as compared with some sand and/or plaster powders used to form metal casting molds.

For some applications two or more layers of sand or other materials with different heat transfer characteristics may be used to form molds in accordance with teachings of the present disclosure. Silica sands, clay sands, quartz sand ($SiO_2$), zircon sand and barium oxide sand are examples of such different materials which may be used to form a mold with optimum heat transfer characteristic at specific locations in an associated mold cavity.

A 3D printer may inject various types of adhesives into each powder layer to securely bond or bind the powder with itself and with adjacent powder layers. Examples of such adhesive materials may include, but are not limited to, one component, adhesive materials, two component adhesive materials and/or any other adhesive material satisfactory for injection through the print head of a 3D printer. Non-flammable adhesives may often be used.

A mold having various features such as shown in FIGS. 5A-5D and 6 may be difficult and time consuming to form using conventional machining equipment and techniques associated with fabricating conventional molds used to form bit heads or other components associated with well drill tools and/or well completion tools. Complex configurations and asymmetrical configurations with relative tight dimensional tolerances may be formed by 3D printing equipment using 3D design data since the need to provide machine tool cutting paths and associated machine tool clearances have been eliminated.

One or more of degassing channels and/or fluid channels such as shown in FIGS. 5A-5D and 6 may not be possible to form on a cost effective, commercial basis using conventional machining equipment and mold forming techniques. Some features of bit heads formed in mold incorporating teachings of the present disclosure may include highly spiraled blades along with mud channels or drilling fluid channels (sometimes referred to as "junk slots") with complex curved shapes, and/or arcuate configurations. Internal tube ways, degassing channels, fluid channels and cutter pockets having complex and/or asymmetric configurations may be efficiently and effectively formed in a mold by using 3D printing and 3D design data in accordance with teachings of the present disclosure.

Mold assembly 200 formed in accordance with teachings of the present disclosure may be described as having a generally cylindrical configuration defined in part by first, open end 201 and second, closed end 202 with mold cavity 252 disposed therebetween. For embodiments such as shown in FIGS. 5A-5D and 6 mold cavity 252 may generally be described as a negative image of a bit head for a fixed cutter drill bit (not expressly shown). Molds formed in accordance with teachings of the present disclosure may have generally uniform outside diameters or may have variable outside diameters (not expressly shown).

Using three dimensional (3D) computer aided design (CAD) data or other 3D design data in combination with a 3D printer and associated techniques in accordance with teachings of the present disclosure may allow forming a plurality of fluid flow channels 206 disposed on exterior portions of mold assembly 200. A plurality of displacements 208 may also be formed on interior portions of mold cavity 252 using a 3D printer and 3D design data in accordance with teachings of the present disclosure.

The configuration and dimensions associated with each displacement 208 may be selected to generally correspond with a respective fluid flow path formed on exterior portions of a resulting bit head. The use of a 3D printer in combination with 3D design data allows forming each displacement 208 with a complex, arcuate configuration corresponding generally with a desired complex, arcuate configuration for the associated fluid flow path disposed on exterior portions of the resulting bit head. For some applications each displacement 208 disposed within mold cavity 252 may have a unique, complex configuration and dimensions.

For some applications the location of fluid flow channels 206 disposed on exterior portions of mold assembly 200 may generally correspond with the location of associated displacements 208 disposed within mold cavity 252. Each flow channel 206 may also be formed with a respective complex, arcuate configuration designed to optimize heating and/or cooling of infiltration materials disposed within mold cavity 252. For some embodiments fluid flow channels 206 may extend from recessed portion or chamber 212 disposed within end 202 of mold assembly 200.

For some applications one or more openings (not expressly shown) may be formed in container 300 to accommodate communication of heating fluids and/or cooling fluids with chamber 212. The temperature and/or flow rate of such heating and/or cooling fluids may be varied depending upon infiltration materials disposed within mold cavity 252 and various characteristics associated with a resulting bit head or other component.

Depending upon the type of materials used to form mold assembly 200 and/or heating and cooling cycles associated with forming a bit head or other component within mold cavity 252, outgassing may occur. For such applications a plurality of internal tube ways or flow paths 214 may be formed within selected portions of mold assembly 200. Flow paths 214 may communicate gasses associated with heating and cooling of mold assembly 200 to associated fluid flow channels 206 and/or exterior portions of mold assembly 200. See FIGS. 5A and 5B. The formation of internal tube ways or flow paths 214 may not be commercially possible using conventional mold forming techniques.

For some embodiments interior portions of mold cavity 252 may be coated with a mold wash to prevent gases produced by heating and/or cooling of mold 200 from entering into powders or matrix materials disposed within mold cavity 252. Various commercially available washes may be satisfactorily used. The mold wash may form a diffusion barrier or create a skin effect to prevent off gases from materials used to form mold 200 from migrating into matrix materials or powders disposed within mold cavity 252.

Mold cavity 252 may be formed with a plurality of negative blade profiles 210 disposed between respective displacements 208. As a result of forming mold assembly 200 with a 3D printer in combination with 3D design data in accordance with teachings of the present disclosure, each negative blade profile 210 may have a respective complex, accurate configuration corresponding with a desired configuration for respective blades disposed on exterior portions of the resulting bit head.

A plurality of negative pocket recesses or pocket profiles 216 may be formed within each negative blade profile 210. Negative pocket recesses 216 may have complex configurations and/or orientations which may not be possible to economically form using conventional mold forming techniques.

As a result of using a 3D printer in combination with 3D design data in accordance with teachings of the present disclosure, cutting elements may be disposed on exterior portions of a bit head at locations and/or orientations which may not be commercially possible to form using conventional mold forming techniques.

For other applications, the wall thickness of a mold may be varied to provide optimum heat transfer at various locations within the mold during heating and cooling of the mold and materials disposed therein. The present disclosure allows engineering a mold and associated container for optimum heat transfer characteristics during both heating and cooling of materials used to form an associated matrix bit head or other components. As a result, the strength of an associated matrix bit body may be substantially increased as compared with previous molds and molding techniques used to form matrix bit bodies or other components.

Figure 6:
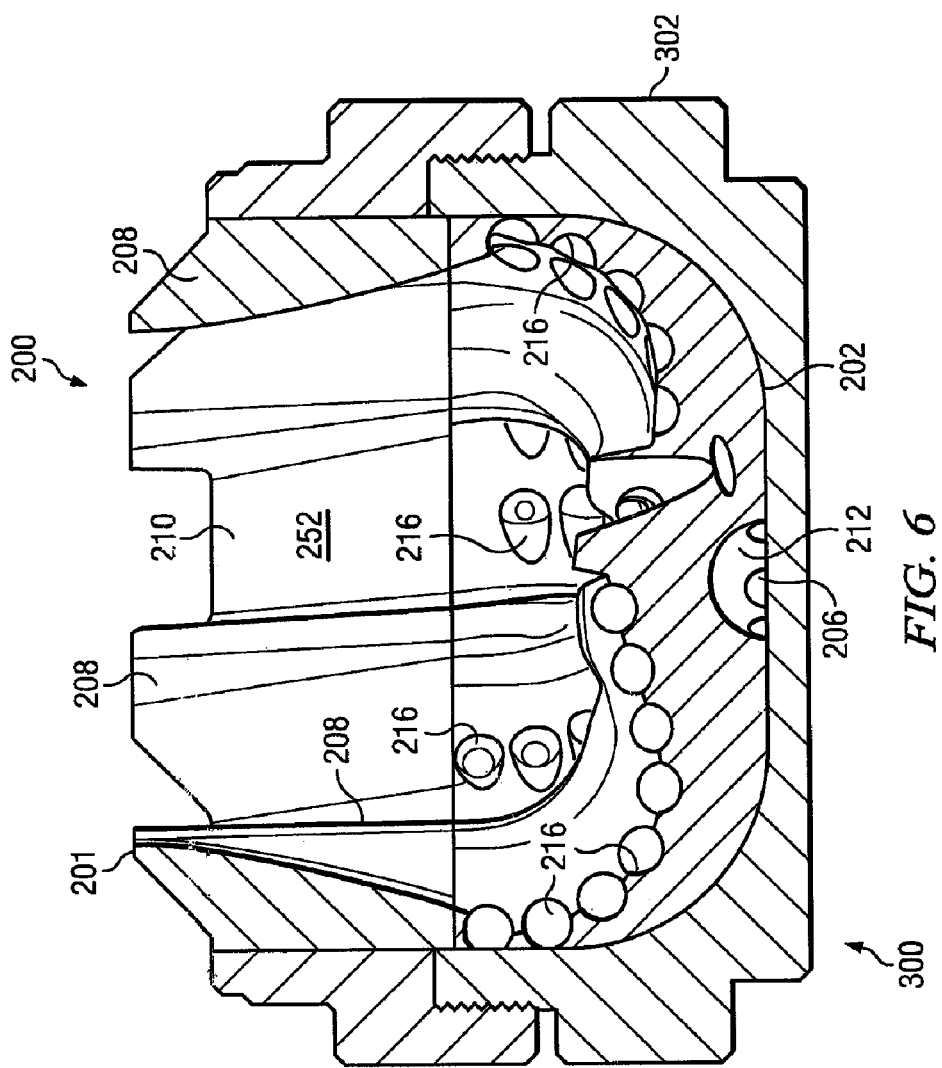
FIG. 6 is a schematic drawing in section showing a mold formed in accordance with teachings of the present disclosure disposed within a container satisfactory for heating the mold and matrix materials disposed within the mold.

Molds formed in accordance with teachings of the present disclosure may be disposed in a container formed from graphite based materials, boron based materials and/or any other materials having satisfactory heat transfer characteristics. Container 300 as shown in FIG. 6 may be formed with a generally cylindrical configuration having interior portions compatible with slidably disposing mold assembly 200 therein. Interior portions of container 300 may be designed to receive corresponding exterior portions of mold assembly 200. For example, second end 302 of container 300 may have an interior configuration which matches a corresponding exterior configuration of end 202 of mold assembly 200. Container 300 may sometimes be referred to as a "housing", "crucible" or "bucket".

A typical roller cone drill bit may include a bit body with an upper portion adapted for connection to a drill string. A plurality of support arms may depend from a lower portion of the bit body. Each arm generally includes a spindle which may protrude radially inward and downward with respect to a rotational axis of an associated bit body.

Conventional roller cone drill bits are typically constructed in three segments. The segments may be positioned together longitudinally with a welding groove between each segment. The segments may then be welded with each other using conventional techniques to form the bit body. Each segment may include an associated support arm extending from the bit body. An enlarged cavity or passageway may be formed in the bit body to receive drilling fluids from an attached drill string. U.S. Pat. No. 4,054,772 entitled "Positioning System for Rock Bit Welding" shows a method and apparatus for constructing a three cone rotary rock bit from three individual segments.

A cone assembly is generally mounted on each spindle and rotatably supported on bearings (not expressly shown) disposed between the spindle and a cavity formed in the cone assembly. One or more nozzles may be disposed in the bit body adjacent to the support arms. The nozzles are typically positioned to direct drilling fluid passing downwardly from the drill string through the bit body toward the bottom or end of a wellbore being formed by an associated rotary drill bit.

Figure 7:
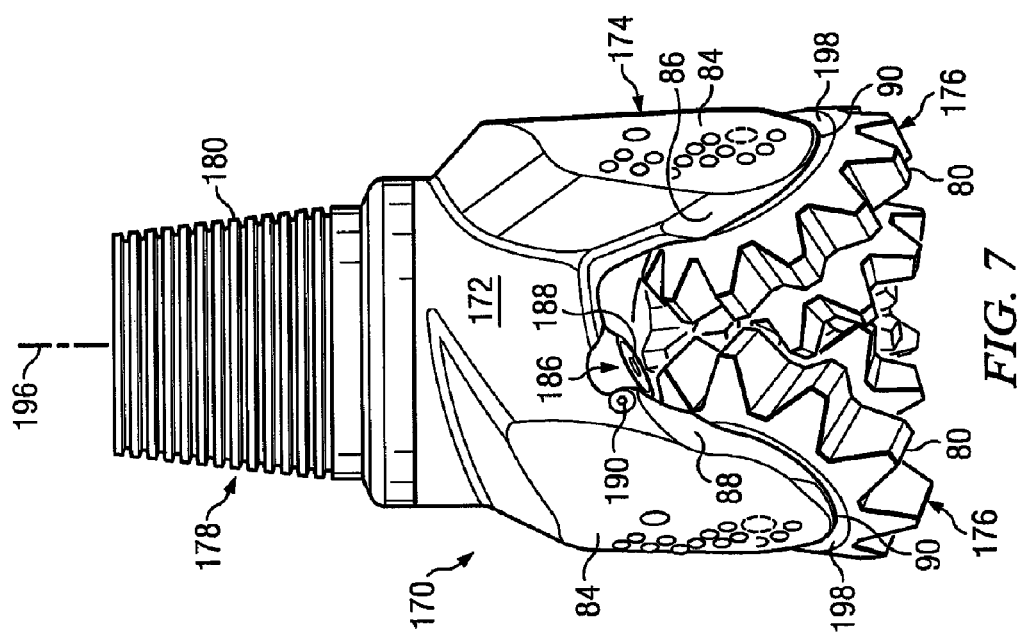
FIG. 7 is a schematic drawing showing a roller cone drill bit which may include various components formed in accordance with teachings of the present disclosure.

Rotary drill bit 170 (as shown in FIG. 7) may include bit body 172 with support arms 174 and respective cone assemblies 176 extending therefrom. Bit body 172 may also include upper portion 178 with American Petroleum Institute (API) drill pipe threads 180 formed thereon. API threads 180 may be used to releasably engage rotary drill bit 170 with a bottomhole assembly or drill string to allow rotation of rotary drill bit 170 in response to rotation of the drill string.

Figure 8:
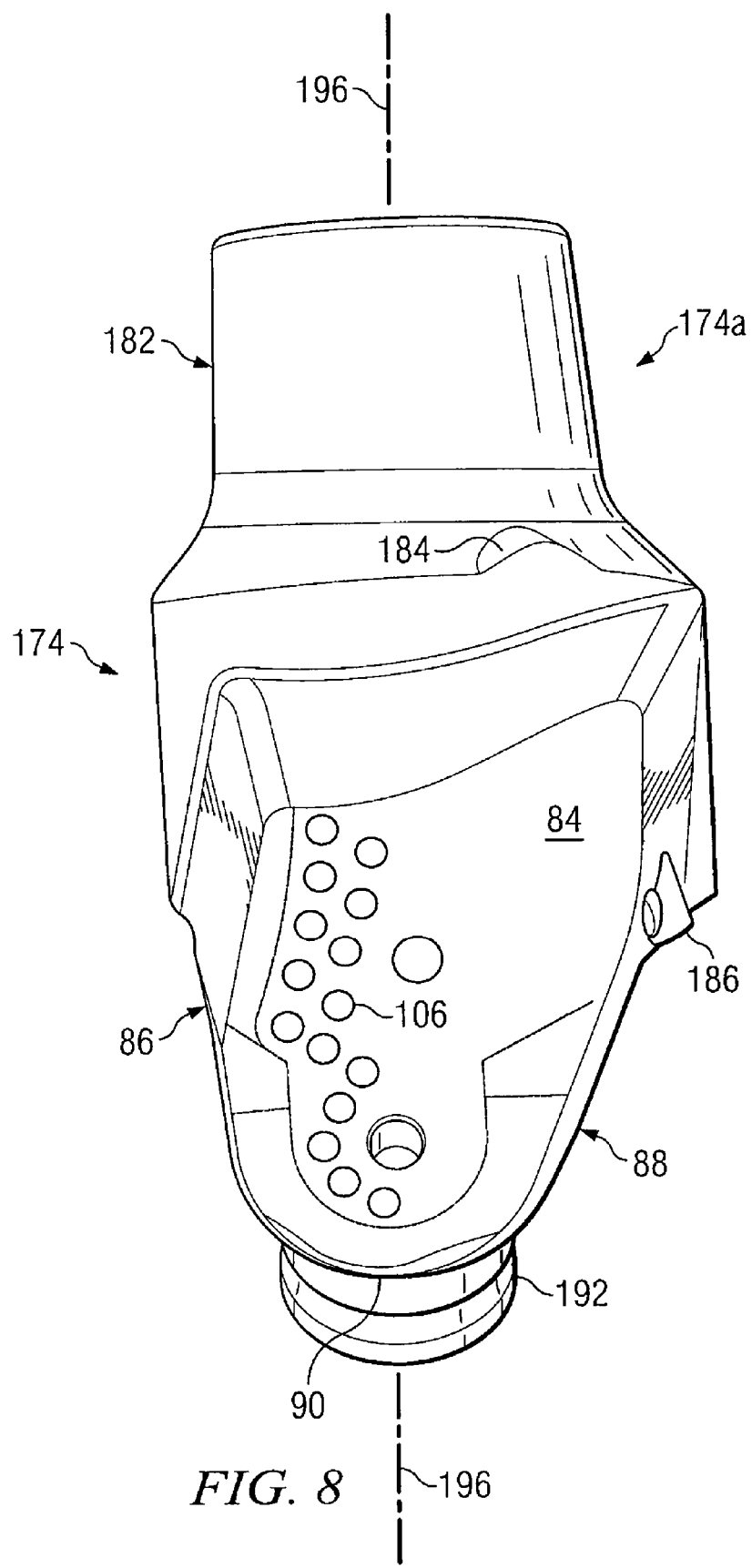
FIG. 8 is a schematic drawing in elevation showing one example of a support arm for a roller cone drill bit which may be formed in accordance with teachings of the present disclosure.

Segment 174a as shown in FIG. 8 may represent one of three segments used to form portions of rotary drill bit 170.

Each segment 174a may include upper portion 182 with respective support arm 174 extending therefrom. Each upper portion 182 may form approximately one third of bit body 172 and associated upper portion 178. Segments 174a may be welded with each other using conventional techniques to form a bit body for a roller cone drill bit. For example, notch 184 may be formed in exterior portions of each segment 174a for use in aligning three segments 174a with each other in an appropriate welding fixture. Each notch 184 may be removed during machining of various surfaces associated with exterior portions of rotary drill bit 170.

An enlarged cavity may be formed within bit body 172 extending through upper portion 178 to receive drilling fluid from a drill string. One or more fluid flow passageways (not expressly shown) may also be formed in bit body 172 to direct fluid flow from the enlarged cavity to respective nozzle housings or receptacles 58.

One or more nozzle receptacles 186 may be formed in exterior portions of bit body 172. See FIGS. 7 and 8. Each receptacle 186 may be sized to receive associated nozzle 188. Various types of locking mechanisms 190 may be used to securely engage each nozzle 188 in respective nozzle receptacle 186.

The lower portion of each support arm 174 may include spindle 192. See FIG. 8. Spindle 192 may also be referred to as "shaft" or "bearing pin." Cone assemblies 176 may be rotatably mounted on respective spindles 192 extending from support arms 170. Each cone assembly 176 may include a respective cone rotational axis (not expressly shown) corresponding generally with an angular relationship between each spindle 192 and associated support arm 170. The cone rotational axis of each cone assembly 176 may be offset relative to bit rotational axis 196 of rotary drill bit 170.

Each cone assembly 176 may include a respective backface 198 having a generally circular configuration. A cavity (not expressly shown) may be formed in each cone assembly 176 extending through associated backface 198. Each cavity may be sized to receive associated spindle 192. Various types of bearings, bearing surfaces, ball retainers and/or seal assemblies may be disposed between interior portions of each cavity and exterior portions of associated spindle 192.

For some applications a plurality of milled teeth 80 may be formed on exterior portions of each cone assembly 172. Milled teeth 80 may be arranged in respective rows. A gauge row of milled teeth 80 may be disposed adjacent to backface 198 of each cone assembly 176. The gauge row may sometimes be referred to as the "first row" of milled teeth 80. Other types of cone assemblies may be satisfactorily used with the present disclosure including, but not limited to, cone assemblies having inserts and compacts (not expressly shown) disposed on exterior surfaces thereof.

For some applications milled teeth 80 may include one or more layers of hard, abrasive materials (not expressly shown). Such layers may be referred to as "hard facing." Examples of hard materials which may be satisfactorily used to form hard facing include various metal alloys and cermets such as metal borides, metal carbides, metal oxides and metal nitrides.

Each support arm 174 may include respective exterior surfaces 84 and an interior surface (not expressly shown) with spindle 192 attached thereto and extending therefrom. Each support arm 174 may also include leading edge 86 and trailing edge 88 with exterior surface 84 disposed therebetween. Exterior portion 84 may sometimes be referred to as a "shirttail." Extreme end 90 of each support arm 170 opposite from upper portion 178 of bit body 170 may sometimes be referred to as a "shirttail tip."

Molds forming in accordance with teachings of the present disclosure may be used to fabricate various components associated with rotary drill bit 170, including but not limited to, segments 174a and/or cones 176. 3D printing equipment and 3D design data may also be used to form models of segments 174a and/or support arms 174. Such models may then be used to fabricate forging dies used to fabricate segments 174a and/or support arms 174.

Although the present disclosure and its advantages have been described in detail, it should be understood that various changes, substitutions and alternations can be made herein without departing from the spirit and scope of the disclosure as defined by the following claims.

What is claimed is:

1. A method of forming a mold operable to fabricate at least one component of a well drilling tool comprising:
   (a) using a three dimensional (3D) printer to deposit a plurality of thin layers of powder;
   (b) using the 3D printer to apply an adhesive material to each thin layer of powder having a configuration and dimensions based on three dimensional (3D) design data associated with the well drilling tool; and
   repeating steps (a) and (b) to produce the mold with a mold cavity having a negative image of the configuration and dimensions based on the 3D design data for the associated well drilling tool.

2. The method of claim 1 further comprising using 3D computer aided design (CAD) data.

3. The method of claim 1 further comprising using material selected from the group consisting of sand, graphite, metal carbides, metal nitrides and metal oxides to form at least a portion of the powder.

4. The method of claim 3, further comprising using an adhesive to form at least a portion of the powder.

5. The method of claim 1 further comprising selecting the adhesive material from a one component adhesive material, a two-component adhesive material, a non-flammable adhesive material or an adhesive material satisfactory for injection through a printer head of a 3D printer wherein the adhesive material is satisfactory for bonding with each layer of the powder with adjacent layers of the powder to form the mold.

6. The method of claim 1 further comprising forming the mold with exterior dimensions, exterior configuration, interior dimensions and interior configuration optimized for heating and cooling materials placed within the mold during formation of the at least one component.

7. The method of claim 1 further comprising forming a container having a generally hollow, cylindrical configuration defined in part by an open, first end sized to receive the mold therein and a second, closed end having an interior configuration compatible with an associated exterior configuration of the mold.

8. The method of claim 7 further comprising foaming the container with exterior dimensions, exterior configuration, interior dimensions and interior configuration optimized for heating and cooling the mold disposed within the container.

9. The method of claim 1 further comprising forming portions of the mold with at least two different layers of sand selected to provide optimum heating and cooling of materials placed within the mold during formation of the at least one component.

10. The method of claim 1 further comprising forming the at least one component for the well drilling tool selected from the group consisting of a bit head, a core bit, a reamer, a near bit reamer, an under reamer and a hole opener, non-retrievable drilling components, aluminum drill bit bodies associated with casing drilling of wellbores, drill string stabilizers, cones for roller cone drill bits, models for forging dies used to fabricate support arms for roller cone drill bits, arms for fixed reamers, arms for expandable reamers, internal components associated with expandable reamers, sleeves attached to an up hole end of a rotary drill bit, rotary steering tools, logging while drilling tools, measurement while drilling tools, side wall coring tools, fishing spears, washover tools, rotors, stators or housing for downhole drilling motors, blades and housings for downhole turbines, and other downhole tools having complex configurations or asymmetric geometries associated with forming a wellbore.

11. The method of claim 1, wherein powder used to form different portions of the mold is comprised of materials having different respective thermal conductivity or respective electrical conductivity.

12. The method of claim 1, further comprising using sand to form at least a portion of the powder.

13. The method of claim 12, wherein the sand is a silica sand, a clay sand, a quartz sand (SiO2), a zircon sand or a barium oxide sand.

14. The method of claim 1, further comprising applying a mold wash to the interior portion of the mold.

15. A method of forming a mold operable to fabricate at least one component of a rotary drill bit comprising:
(a) using a three dimensional (3D) printer to deposit a plurality of thin layers of powder;
(b) using the 3D printer to apply an adhesive material to each thin layer of powder corresponding with a configuration and dimensions based on three dimensional (3D) design data for the rotary drill bit; and
repeating steps (a) and (b) to produce a mold having a mold cavity with a configuration and dimensions based on the 3D design data associated with the rotary drill bit, the mold having a negative image of the component of the rotary drill bit.

16. The method of claim 15 further comprising using material selected from the group consisting of sand, graphite, carbide and boron nitride to form a least a portion of the powder.

17. The method of claim 15 further comprising selecting the adhesive material from the group consisting of a one component adhesive material, a two-component adhesive material, a non-flammable adhesive material or an adhesive material satisfactory for injection through a printer head of a 3D printer wherein the adhesive material is satisfactory for bonding each layer of the powder with adjacent layers of the powder to form the mold.

18. The method of claim 15 further comprising forming the mold with exterior dimensions, exterior configuration, interior dimensions and interior configuration optimized for heating and cooling materials placed within the mold during formation of the at least one component.

19. The method of claim 15 further comprising forming a container having a generally hollow, cylindrical configuration defined in part by an open, first end sized to receive the mold therein and a second, closed end having an interior configuration compatible with an associated exterior configuration of the mold.

20. The method of claim 15 further comprising forming the container with exterior dimensions, exterior configuration, interior dimensions and interior configuration optimized for heating and cooling the mold disposed within the container.

21. The method of claim 15 further comprising forming portions of the mold with a variable wall thickness selected to provide optimum heating and cooling of matrix materials placed within the mold during formation of a matrix bit heat for the rotary drill bit.

22. The method of claim 15 further comprising forming portions of the mold with a variable wall thickness selected to provide optimum cooling of a molten steel alloy placed within the mold during formation of a steel bit head for the rotary drill bit.

23. The method of claim 15 further comprising:
forming the mold cavity with a plurality of displacements disposed therein and each displacement having a complex, arcuate configuration corresponding with a desired configuration for a respective fluid flow path disposed on exterior portions of the bit head; and
forming the mold cavity with a plurality of negative blade profiles with each negative blade profile disposed between associated displacements and each negative blade profile having a complex, arcuate configuration corresponding with a desired configuration for a respective blade disposed on exterior portions of the bit head.

24. The method of claim 23 further comprising forming a plurality of fluid flow channels disposed on exterior portions of the mold with each fluid flow channel located generally proximate one of the displacements disposed within the mold cavity.

25. The method of claim 24 further comprising forming each fluid flow channel disposed on exterior portions of the mold with a complex, arcuate configuration.

26. A method of forming a mold operable to fabricate at least one component of a steel bit body for a fixed cutter drill bit comprising:
(a) using a three dimensional (3D) printer to deposit a plurality of thin layers of powder;
(b) using the 3D printer to apply an adhesive material to each thin layer of powder having a configuration and dimensions based on the three dimensional (3D) design data associated with the at least one component of the steel bit body; and
repeating steps (a) and (b) to produce the mold with a mold cavity having a configuration and dimensions corresponding with the 3D design data for the associated at least one component of the steel bit body, the mold having a negative image of the component of the steel bit body.

27. The method of claim 26 further comprising:
placing the mold in a container operable to control cooling of the mold;
pouring a molten steel alloy into the mold; and
solidifying the molten steel alloy to form the at least one component.

28. The method of claim 27 further comprising forming the mold with exterior dimensions, exterior configuration, interior dimensions and interior configuration optimized for cooling the molten steel alloy during solidification of the at least one component.

29. The method of claim 26 further comprising using the 3D printer to deposit a plurality of the thin layers of powder and applying binder material to each of the thin layers of powder to form a mold cavity having a configuration and dimensions corresponding with a bit head for the steel bit body.

30. The method of claim 26 further comprising using the 3D printer to deposit a plurality of the thin layers of powder and applying binder material to each of the thin layers of powder to form a mold cavity having a configuration and dimensions operable to form a bit head and a metal shank as integral components of the steel bit body.

31. A method of forming a mold operable to fabricate at least one component of a well completion tool comprising:

(a) using a three dimensional (3D) printer to deposit a plurality of thin layers of powder;

(b) using the 3D printer to apply binder material to each thin layer of powder having a configuration and dimensions derived from three dimensional (3D) design data associated with the well completion tool; and repeating steps (a) and (b) to produce a mold having a mold cavity with a configuration and dimensions based on the 3D design data for the associated well completion tool, the mold having a negative image of the component of the well completion tool.

32. The method of claim 31 further comprising using material selected from the group consisting of sand, graphite, carbide and boron nitride to form at least a portion of the powder.

33. The method of claim 31 further comprising selecting the adhesive material from the group consisting of a one component adhesive material, a two-component adhesive material, a non-flammable adhesive material or an adhesive material satisfactory for injection through a printer head of a 3D printer wherein the adhesive material is satisfactory for bonding each layer of the powder with adjacent layers of the powder to form the mold.

34. The method of claim 31 further comprising forming the mold with exterior dimensions, exterior configuration, interior dimensions and interior configuration optimized for heating and cooling materials placed within the mold during formation of the at least one component.

35. The method of claim 31 further comprising forming a container having a generally hollow, cylindrical configuration defined in part by an open, first end sized to receive the mold therein and a second, closed end having an interior configuration compatible with an associated exterior configuration of the mold.

36. The method of claim 35 further comprising forming the container with exterior dimensions, exterior configuration, interior dimensions and interior configuration optimized for heating and cooling the mold disposed within the container.

37. The method of claim 31 further comprising forming portions of the mold with a variable wall thickness selected to provide optimum heating and cooling of materials placed within the mold during formation of the at least one component.

38. The method of claim 31 further comprising forming the at least one component for a well completion tool selected from the group consisting of production packer components, float equipment, casing shoes, casing shoes with cutting structures, well screen bodies and connectors, gas lift mandrels, downhole tractors for pulling coiled tubing, tool joints, wired (electrical and/or fiber optic) tool joints, drill in well screens, rotors, stator or housings for downhole motors, blades or housings for downhole turbines, latches for downhole tools, downhole wireline service tools and other downhole tools have complex configurations or asymmetric geometries.

39. A method of forming a mold operable to fabricate at least one component of a well drilling tool comprising:
(a) using a three dimensional (3D) printer to deposit a plurality of thin layers of powder comprising a sand;
(b) using the 3D printer to apply an adhesive material to each thin layer of powder having a configuration and dimensions based on three dimensional (3D) design data associated with the well drilling tool to securely bind the powder with itself and with adjacent powder layers; and repeating steps (a) and (b) to produce the mold with a mold cavity having a negative image of the configuration and dimensions based on the 3D design data for the associated well drilling tool.

40. The method of claim 39, further comprising applying a mold wash to the interior portion of the mold.

41. The method of claim 39, wherein the sand is a silica sand, a clay sand, a quartz sand ($SiO2$), a zircon sand or a barium oxide sand.

42. The method of claim 39, the powder further comprising material selected from the group consisting of a graphite, a metal carbide, a metal nitride, a boron nitride and a metal oxide to form at least a portion of the powder.

43. The method of claim 39, further comprising using an adhesive to form at least a portion of the powder.

44. A method of forming a mold operable to fabricate at least one component of a well drilling tool comprising:
(a) using a three dimensional (3D) printer to deposit a plurality of thin layers of powder;
(b) using the 3D printer to apply an adhesive material to each thin layer of powder having a configuration and dimensions based on three dimensional (3D) design data associated with the well drilling tool to securely bind the powder with itself and with adjacent powder layers; and repeating steps (a) and (b) to produce the mold with a mold cavity having a negative image of the configuration and dimensions based on the 3D design data for the associated well drilling tool, the mold having exterior dimensions, exterior configuration, interior dimensions and interior configuration optimized for heating and cooling materials placed within the mold during formation of the at least one component.

45. A method of foaming a mold operable to fabricate at least one component of a well drilling tool comprising:
(a) using a three dimensional (3D) printer to deposit a plurality of thin layers of powder;
(b) using the 3D printer to apply an adhesive material to each thin layer of powder having a configuration and dimensions based on three dimensional (3D) design data associated with the well drilling tool to securely bind the powder with itself and with adjacent powder layers; and repeating steps (a) and (b) to produce the mold with a mold cavity having a negative image of the configuration and dimensions based on the 3D design data for the associated well drilling tool, further comprising forming portions of the mold with at least two different layers of sand selected to provide optimum heating and cooling of materials placed within the mold during formation of the at least one component.

46. A method of forming a mold operable to fabricate at least one component of a well drilling tool comprising:
(a) using a three dimensional (3D) printer to deposit a plurality of thin layers of powder;
(b) using the 3D printer to apply an adhesive material to each thin layer of powder having a configuration and dimensions based on three dimensional (3D) design data associated with the well drilling tool to securely bind the powder with itself and with adjacent powder layers; and repeating steps (a) and (b) to produce the mold with a mold cavity having a negative image of the configuration and dimensions based on the 3D design data for the associated well drilling tool component, further comprising forming portions of the mold with a variable wall thickness selected to provide optimum heating and cooling of matrix materials placed within the mold during formation of the associated well drilling tool component.

\* \* \* \* \*